Patented July 6, 1926.

1,591,534

UNITED STATES PATENT OFFICE.

JOHN J. KESSLER, OF ST. LOUIS, MISSOURI.

PROCESS FOR INSULATING ELECTRICAL COILS.

No Drawing.   Application filed February 28, 1924. Serial No. 695,873.

This invention relates to a process for insulating electrical coils and has for its object the production of a process of the class described by means of which electrical coils may be thoroughly insulated with an infusible resin, thus providing said coils with an insulating covering which may not be afterwards softened by heating.

In the insulation of electrical coils which have been wound with a number of turns of insulated wire, such as cotton covered wire, silk covered wire, enameled wire, or combinations of these, it has been a common practice to dip them into an insulating varnish or impregnate them with a solid insulating compound, which has been first rendered fluid by means of heating. The method of dipping into an insulating varnish has two disadvantages in that (first) the presence of the necessary solvent for the varnish and the subsequent removal of this from the varnish makes it impossible to completely fill the voids in the coil with the base substance of the varnish, and (second) when oxidizing oils are used in the formula of the varnish it is difficult to thoroughly oxidize such oils on the inside of the coil. The method of impregnating with a solid compound rendered fluid by heating is capable of filling up completely the voids of the coil, but then again the disadvantage occurs that such a compound will be again softened by heating the coil, and at sufficiently high temperatures the compound will run out of the coil.

Types of such compounds in common use are—

1. Asphaltic compounds. These are not oilproof.

2. Resinous compounds. Such mixtures include copals, rosin and castor oil, or again, wood or coal tar pitches.

This second type of compound is in common use in the manufacture of coils which are to operate under oil, such as transformer coils. They are more or less oilproof but give off during continued operation more or less "sludging" substance, which is considered objectionable by engineers.

The present invention is intended to eliminate the objections to the processes mentioned above, and comprises a process whereby an electrical coil may be impregnated with a solid compound by heating, after which this compound is polymerized inside of the coil and thus loses the property of becoming afterwards softened by heating.

My process does not depend therefore upon any oxidation of the resin or varnish base inside of the coil, and while some oxidation does take place on the outside of the coil where the hot resin comes in contact with the air, the main feature of the process lies in the fact that a fusible resin can be polymerized on the inside of the coil. In fact, very large coils, that is to say, coils of considerable cubical capacity, may be filled with non-fusible resin and thus permanently insulated.

In carrying out my process I make use of the well known fact that non-fusible resins may be produced by the interaction of phenolic substances with aldehydes. Such resins are produced in a variety of ways and I make no claim for invention in their production. I do claim, however, that by a new manipulation of these substances I am able to produce a result that has not been heretofore obtained.

In following out my process I first take a phenolic resin that has been incompletely polymerized, that is to say, one which has been made by treating a phenolic substance with an amount of aldehyde substance which is sufficient only to produce partial polymerization and which produces a permanently fusible resin or a resin which may be kept molten for a sufficient period of time to be used in impregnating tanks. Such a resin may be prepared by treating phenols, cresols, or their polymers with an amount of formaldehyde or its polymers insufficient to produce complete polymerization, but sufficient to produce a fusible resin which will maintain its fluidity for long periods of time. I have found in practice that in preparing such an incompletely polymerized or fusible resin it is advisable that the proportions of aldehyde substance which are used to treat the phenol substance be kept below 10 percent of the phenol substance present. Greater proportions of aldehyde substance, such as 15 percent and above, will produce the completely polymerized or infusible variety of resin. Before treating the coil with such an impregnating compound, I first treat it, as by dipping in a solution or otherwise, with aldehyde substance, and if water or other solvent is used as a carrier for the aldehyde the coil is first dried out by heating in a vacuum oven or otherwise to rid it of the excess of water. Such an aldehyde treated coil then is impregnated or treated with the incompletely polymerized phenol resin in a molten condition and the reaction is completed within the coil either by subsequent heating of the coil or by long standing of the coil at ordinary temperatures. By using the process just described it is possible to thoroughly insulate a coil with an infusible resin by a process which may be carried out continuously.

In order to keep the resin used for impregnating sufficiently fluid to penetrate electrical coils, I have found that temperatures higher than 200° F. are desirable. In practice I have used temperatures from 210° F. to 360° F.

Impregnating resin used in following out my process remains fluid until it reaches the inner surfaces of the aldehyde treated coil and becomes polymerized upon reaching them. If desired, the coil may be afterwards baked in an oven and the excess of material on the outside of the coil drained off. This will permit the layers of the compound which have not come into contact with the aldehyde substance to be hardened by oxidation, thus completing the hardening of the compound.

In further describing my invention I will state that I do not limit myself to any fixed quantities of phenolic-aldehyde reaction mixtures for the production of the original resin. Experience has shown me, however, that a ratio of approximately 1 to 10, that is, 10 parts of phenolic substance to 1 part of aldehyde substance, gives a practical result, although ratios slightly greater or slightly less than this may be used. Furthermore, I do not limit myself to the exact amount of aldehyde substance which is introduced into the windings of the coil. I have found here again that a 10 percent solution of aldehyde substance will leave between the turns of wire a quantity sufficient to produce the result desired, although a greater or lesser amount may be used.

The main feature of my invention is that the aldehyde substance is placed within the coil and that the coil is then impregnated with an incompletely polymerized phenolic aldehyde resin which has been liquefied by heating above the fusion point. By phenolic substance I mean any ring compound containing the hydroxyl group, such a phenol, cresol, guiacol, etc., or mixtures containing them. By aldehyde substance I mean any compound or mixtures containing the aldehyde group, such as formaldehyde, paraldehyde, hexa-methylenetetramine, furfural, etc.

I am aware that processes have been described for impregnating coils with phenaldehyde resins wherein a fusible or soluble resin is first mixed with a further quantity of aldehyde and then introduced into the coil by dipping or impregnating. Such mixtures are unstable, especially if they contain sufficient added aldehyde to become quickly converted into infusible resin. My process differs from such processes in that the aldehyde used for the final polymerization is kept entirely away from the phenol aldehyde resin until that resin enters the coil. After said resin has entered the coil it is quickly polymerized to the infusible condition. My process therefore affords a practical method of operation which offers several distinctive features, among which may be mentioned the important fact that the impregnating resin may be kept in a melted condition over long periods of time and may be used day after day without increasing sufficiently in melting point to become unworkable. In addition to the foregoing, a distinct advantage in connection with the use of my process arises from the fact that the excess of material on the outside of the coil drains off and leaves a smooth surface without thick accretions of polymerized compound. Finally, the action within the coil is very rapid and proceeds in a complete and uniform manner.

I claim:—

1. The process of insulating coils which comprises distributing an aldehyde through the coil, and then impregnating the coil with an incompletely polymerized phenolic aldehyde resin liquefied by heating above the fusion point.

2. The process of insulating coils which comprises dipping the coil in an aldehyde solution, evaporating the solvent and then impregnating the coil with an incompletely polymerized phenolic aldehyde resin liquefied by heating above the fusion point.

3. The process of insulating coils which comprises saturating the coil with an aldehyde in solution, evaporating the solution, impregnating the coil with an incompletely polymerized phenolic aldehyde resin liquefied by heating above the fusion point, and then baking the coil to complete the polymerization.

4. The process of insulating coils which comprises saturating the coil by dipping same into an aldehyde in solution, evaporating the solution, impregnating the coil with an incompletely polymerized phenolic aldehyde resin liquefied by heating above the fusion point, and then baking the coil to complete polymerization.

5. The process of insulating coils which comprises saturating the coil with an aldehyde in solution, evaporating the solution, impregnating the coil with an incompletely polymerized phenol aldehyde resin in a molten condition, and then baking the coil to complete polymerization.

6. The process of insulating coils which comprises saturating the coil with a solution of hexa-methylenetetramine, drying said coil, impregnating the coil with an incompletely polymerized phenol aldehyde resin liquefied by heating above the fusion point and then baking to complete polymerization.

7. The process of insulating coils which comprises distributing an aldehyde through the coil, and then impregnating the coil with an incompletely polymerized phenol aldehyde resin liquefied by heating above the fusion point.

8. The process of insulating coils which comprises dipping the coil in an aldehyde solution, evaporating the solution, and then impregnating the coil with an incompletely polymerized phenol aldehyde resin liquefied by heating above the fusion point.

9. The process of indurating porous objects which comprises distributing an aldehyde throughout the object and then impregnating the object with an incompletely polymerized phenol aldehyde resin liquefied by heating above the fusion point.

In testimony that I claim the foregoing I hereunto affix my signature.

JOHN J. KESSLER.